Nov. 25, 1952   G. CONNORS ET AL   2,619,361
DIRIGIBLE FRONT UNIT FOR HIGH CLEARANCE TRACTORS
Filed Feb. 18, 1947   2 SHEETS—SHEET 1

Inventors
Gerald Connors,
Fedora Chicoine,
By
Attorneys

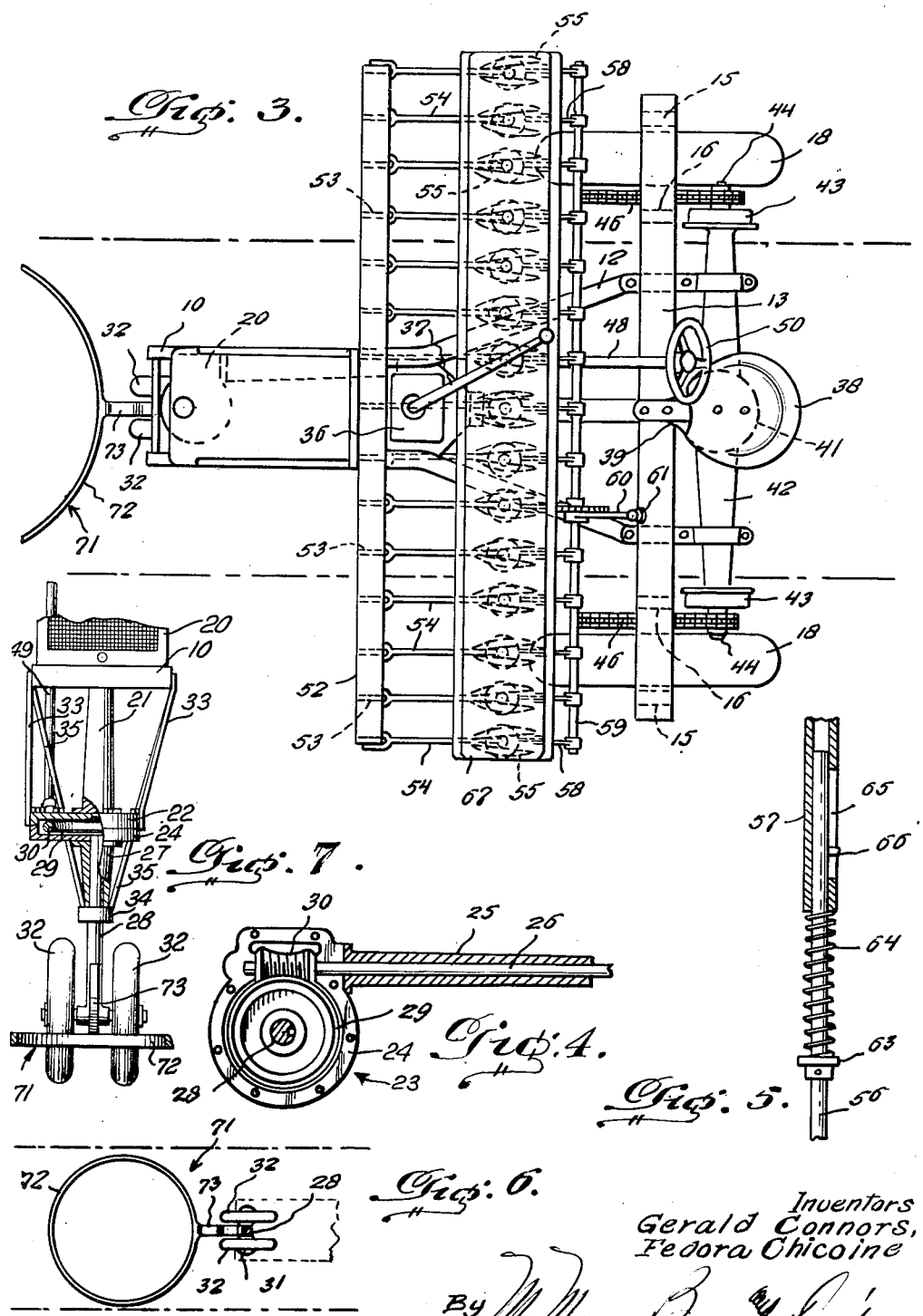

Patented Nov. 25, 1952

2,619,361

UNITED STATES PATENT OFFICE 2,619,361

DIRIGIBLE FRONT UNIT FOR HIGH CLEARANCE TRACTORS

Gerald Connors and Fedora Chicoine, Jefferson, S. Dak.

Application February 18, 1947, Serial No. 729,334

3 Claims. (Cl. 280—97)

Our invention relates to agricultural machinery and more particularly to grain drills.

The object of our invention is to provide a self propelling grain drill adapted to sow winter wheat or rye between rows of corn early in fall before the corn matures and having clearance enough to prevent any damage to the corn plants.

Another object of our invention is to provide a grain drill of the character indicated above adapted to be steered easily between two rows of corn and to plant the entire area between these rows and one half of each of the areas between the adjacent corn rows, in which the rear drive wheels travel.

Other objects of our invention may appear in the following specification describing our invention with reference to the accompanying drawings illustrating a preferred embodiment of our invention.

It is however to be understood, that our invention is not to be limited or restricted to the exact construction and combination of parts described in the specification and shown in the drawings, but that such changes and specifications can be made, which fall within the scope of the claims appended hereto:

In the drawings

Figure 3 is a top plan view of the grain drill.

Figure 4 is a sectional view taken on line 4—4 in Figure 1.

Figure 5 is a fragmentary elevational side view, partly shown in section, of a pressure rod used in connection with the grain drill according to our invention, and Figure 6 is a view taken on the line 6—6 of Figure 1.

Figure 7 is an end elevational view, partly in section, taken from the left-hand end of Figure 1.

Figure 1:
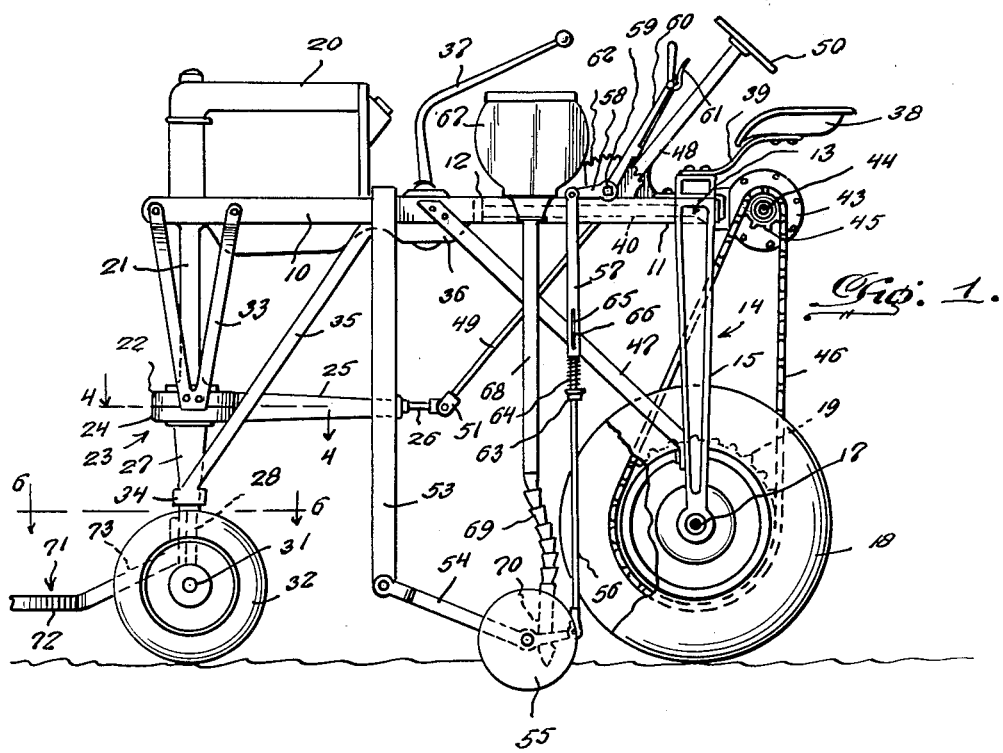
Figure 1 is an elevational side view of the grain drill according to our invention.
Figure 2:
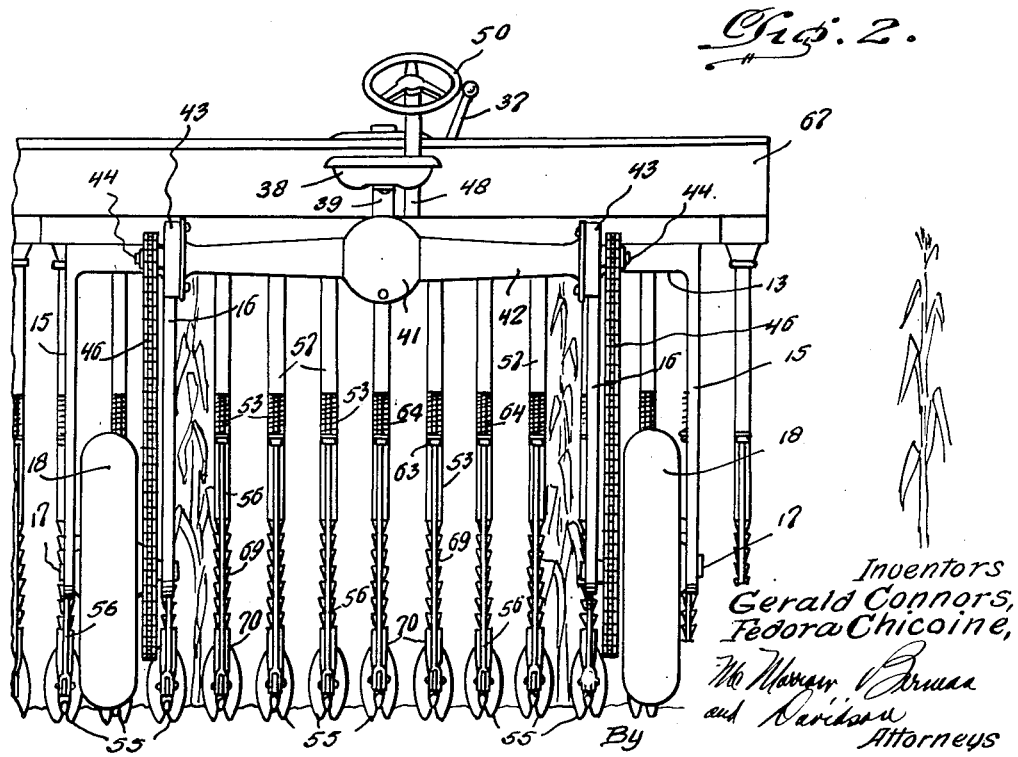
Figure 2 is an elevational rear end view of the grain drill.

Referring now in detail to the drawings the grain drill forming the subject matter of our invention has a frame consisting of a comparatively narrow front portion 10, a comparatively wide rear portion 11 and a middle portion 12 connecting the front and rear portions and increasing in width from the front to the rear.

Adjacent the rear end of the rear frame portion 11 the transverse member 13 of a yoke 14 is secured on top of the frame and two vertical end members 15 of said yoke 14 are integrally formed or firmly connected with the transverse member 13 and extend downwardly. At a distance inwardly from each end member 15 an intermediate vertical member 16 is integrally formed or firmly connected with the transverse member 13 and extends downwardly therefrom.

An axle 17 is rotatably supported by each pair of adjacent vertical yoke members 15 and 16 and is arranged adjacent the lower ends of the vertical yoke members. On each axle 17 a rear driving wheel 18 is rigidly but removably mounted between the vertical yoke member 15 and 16 supporting the axle, which extends inwardly beyond the corresponding intermediate vertical yoke member 16. A sprocket gear 19 is rigidly mounted on the end of each axle 17 extending beyond the intermediate vertical yoke member 16.

A complete internal combustion engine assembly 20 is securely mounted on the front frame portion 10, and a top support column 21 is firmly secured to said front frame portion 10 adjacent its front end and in the transverse center thereof and extends vertically downward therefrom. On the lower end of this top support column the upper half 22 of a housing 23 is formed adapted to receive and rotatably support a worm and gear transmission. The lower half 24 of this housing 23 is provided with a rearwardly extending tubular bearing member 25, which is arranged off-center relative to the housing 23, so that a shaft 26 can be arranged rotatably in said member.

A tubular vertically downwardly extending bearing 27 is integrally formed with the lower housing half 24 and a steering shaft 28 is rotatably arranged in said bearing. A worm gear 29 is rigidly mounted on the top end of this vertical steering shaft 28 and is arranged in the housing 23. A worm 30 is rigidly mounted on the forward end of the horizontal steering shaft 26. The two housing halves are secured with each other by a plurality of bolts.

To the lower end of the vertical steering shaft 28 a horizontal axle 31 is secured, on which two comparatively small front wheels 32 are mounted rotatably.

The length of the vertical yoke members 15 and 16, and the combined length of the upper support column 21, the vertical bearing 27, the portion of the vertical steering shaft extending below the vertical bearing 27 and the height of the housing 23 are such that the clearance between the ground and the frame of the grain drill is approximately six feet or more, when the drill is assembled.

A substantially isosceles stiffening bracket 33 is fastened with the ends of its side-members to each side member of the front frame portion 10 and extends downwardly therefrom. The apex of each bracket 33 is secured to the upper housing half 22.

On the end of the vertical bearing 27 a ring 34 is firmly attached and two strut members 35 are secured to this ring and extend upwardly, outwardly and rearwardly therefrom. The upper ends of these struts are firmly connected with the rear end of the front frame portion 10.

A gear housing 36 is mounted on the middle frame portion 12 and contains the transmission gears (not shown) driven by the motor 20. A gear shift lever 37 extends upwardly and rearwardly, so that it can easily be reached and manipulated by a driver seated on a seat 38 mounted by means of a blade spring 39 onto the transverse member 13 of the yoke 14.

A drive shaft 40 connects the transmission gears in the gear housing 36 with the differential gears (not shown) located in the differential housing 41, which is formed on the central portion of a rear axle housing 42 fastened to and supported by the rear frame portion 11.

On each end of the rear axle housing 42 a bearing housing 43 is secured, and on the outer end of each rear axle 44 a comparatively small sprocket gear 45 is rigidly mounted. A sprocket chain 46 is trained over each pair of corresponding sprocket gears 19 and 45.

On each side of the middle frame portion 12 a brace member 47 extends downwardly, rearwardly and outwardly to the lower end of the intermediate vertical yoke member 16.

On the rearward frame portion 11, forwardly of the seat 38, a tubular guide and bearing member 48 is mounted and a steering rod 49 is arranged in said member and extends upwardly and downwardly therethrough. On its upper end, just above the guide member 48, a steering wheel 50 is secured and its lower end is connected with the horizontal steering shaft 26 by means of a universal joint 51.

The distance between the two rear wheels 18 is such, that the yoke straddles two rows of corn and the wheels travel in the middle of the area between the adjacent rows of corn.

A transverse beam 52 is arranged on the rear end of the front frame portion 10 and extends to both sides beyond the frame. Vertical downwardly extending pivot supports 53 are fastened onto this beam and are preferably spaced from each other so that seven pivot supports are located between the two corn rows straddled by the yoke 14 and four outside of the area between these rows.

On the lower end of each pivot support 53 a bell crank lever 54 is pivotally mounted, and on the apex of each bell crank lever 54 a pair of disk furrow openers 55 are rotatably mounted in conventional, well known manner. On the rearward end of each bell crank lever 54 a pressure rod 56 is pivotally mounted. The free end of each pressure rod 56 is slidably arranged in a tubular extension member 57, the free end of which is pivotally connected with one end of a lever 58. All levers 58 are rigidly mounted on a transverse shaft 59, and a hand lever 60 is also rigidly mounted on the transverse shaft 59, which is rotatably supported on the frame.

The hand lever 60 is equipped with a spring biased locking lever 61 adapted to engage an arcuate locking rack 62 to secure the disks 55 in adjusted position.

To protect the disks 55 against damage in case they should strike a rock or the like, each pressure rod 56 is provided with an adjustable collar 63 and a helical spring 64 surrounding the rod and abutting the adjusted collar 63 and the lower end of the corresponding tubular extension member 57. Each extension member is provided with an axially extending slot 65, through which a pin 66 extends, which is fastened in each pressure rod 56.

A seed grain hopper 67 rests on top of the frame in front of the adjusting rack 62 and is provided with a plurality of seed distributing tubes 68. Each tube has at its lower end a flexible tubular member 69, which ends in a stiff nozzle 70 arranged between the corresponding pair of furrow opening discs 55.

On the vertical steering shaft 28 a circular guide member 71 is arranged. This member has an annular forward portion 72, the outside diameter whereof is a little shorter than the distance between two rows of corn. The guide member has a fastener arm 73 extending rearwardly and upwardly from the annular portion 72 and clamped onto the vertical steering shaft 28.

The above description shows clearly that a grain drill according to our invention can be driven through a corn field at the time when the corn just begins to mature without damaging the corn. The clearance between the upper structure of the grain drill and the ground is high enough to permit the corn to go underneath said upper structure. The provision of the annular guide member enables the driver to keep the grain drill steadily between two rows of corn. This arrangement brings about the advantage that the grain will be planted in even parallel furrows at a time when the corn will protect the soil from drying out in contrast to the disadvantage encountered when planting grain in the spring when the weather is usually such that it is mostly too late to be able to sow at the proper time.

Having described our invention we claim as new and desire to secure by Letters Patent:

1. In a high-clearance grain drill, a horizontally disposed frame, a pair of wheels arranged underneath one end of said frame and rotatably supported on the latter, an extension frame projecting forwardly from the other end of said frame having one end fixedly secured thereto, a vertically disposed post arranged underneath the other end of said extension frame and dependingly supported from the latter, bearing means dependingly carried by said extension frame, a vertically disposed shaft having one end in face-to-face relationship with respect to the free end of said post and rotatably supported in said bearing means, a rotatable wheel unit arranged below the other end of said shaft and fixedly secured to the latter, transmission means interposed between the facing ends of said post and said vertically disposed shaft and operatively connected to the latter, a horizontally disposed rotatable steering shaft having one end operatively connected to said transmission means, and manually actuated means carried by said frame and operatively connected to the other end of said steering shaft for effecting rotation of the latter.

2. In a high-clearance grain drill, a horizontally disposed frame, a pair of wheels arranged underneath one end of said frame rotatably supported on the latter, an extension frame projecting forwardly from the other end of said frame and having one end fixedly secured thereto, a vertically disposed post arranged underneath the other end of said extension frame and dependingly supported on the latter, bearing means dependingly carried by said extension frame, a vertically disposed shaft having one end in face-to-face relationship with respect to the free end of said post and rotatably supported in said bearing means, a rotatable wheel unit arranged below the other end of said shaft and fixedly secured to the latter, a housing interposed between the facing ends of said post and said shaft and fixedly secured to said post, a horizontally disposed worm-gear mounted within said housing and fixedly secured to said facing end of said shaft, a horizontally disposed rotatable steering shaft having one end extending into said housing, said one end having fixedly secured thereto a worm in engagement with said worm-gear, and manually actuated means carried by said frame and operatively connected to the other end of said steering shaft for effecting rotation of the latter.

3. In a high-clearance grain drill, a horizontally disposed frame, a pair of wheels arranged underneath one end of said frame and rotatably supported on the latter, an extension frame projecting forwardly from the other end of said frame and having one end fixedly secured thereto, a vertically disposed post arranged underneath the other end of said extension frame and dependingly supported from the latter, bearing means dependingly carried by said extension frame, a vertically disposed shaft having one end in face-to-face relationship with respect to the free end of said post and rotatably supported in said bearing means, a rotatable wheel unit arranged below the other end of said shaft and fixedly secured to the latter, a housing interposed between the facing ends of said post and said shaft and fixedly secured to said post, a horizontally disposed worm-gear mounted within said housing and fixedy secured to said facing end of said shaft, a horizontally disposed rotatable steering shaft having one end extending into said housing, said one end having fixedly secured thereto a worm in engagement with said worm-gear, and manually actuated means carried by said frame operatively connected to the other end of said steering shaft for effecting rotation of the latter, said last-named means comprising a steering rod rotatably supported intermediate its ends in said frame, and having one end pivotally connected to said other end of said steering shaft, and a steering wheel supported on said frame and operatively connected to said steering rod.

GERALD CONNORS.
FEDORA CHICOINE.

REFERENCES CITED

The following references are of record in the file of this patent:

UNITED STATES PATENTS

| Number | Name | Date |
|---|---|---|
| 641,718 | Miller | Jan. 23, 1900 |
| 694,499 | Smith | Mar. 4, 1902 |
| 861,323 | Sharick | July 30, 1907 |
| 911,474 | Burks | Feb. 2, 1909 |
| 1,217,293 | Freeman | Feb. 27, 1917 |
| 1,347,818 | Malin | July 27, 1920 |
| 1,372,068 | Freeman | Mar. 22, 1921 |
| 1,560,043 | Davidson | Nov. 3, 1925 |
| 1,878,871 | Lindgren | Sept. 20, 1932 |
| 1,918,950 | Altgelt | July 18, 1933 |
| 2,063,851 | Ray | Dec. 8, 1936 |
| 2,184,198 | Seeber | Dec. 19, 1939 |
| 2,222,904 | Heaslet | Nov. 26, 1940 |
| 2,327,204 | McLemore | Aug. 17, 1943 |
| 2,361,083 | Burnett | Oct. 24, 1944 |

FOREIGN PATENTS

| Number | Country | Date |
|---|---|---|
| 254,983 | Italy | Oct. 1, 1927 |